UNITED STATES PATENT OFFICE 2,570,156

SIGNAL COMPARATOR SYSTEM

Harold R. Reiss, Philadelphia, Pa.

Application February 13, 1950, Serial No. 143,840

9 Claims. (Cl. 175—320)

This invention relates to a novel signal comparator circuit for use in a system of the character disclosed in my prior application, Serial No. 16,196, filed March 22, 1948, which system is adapted to determine or measure public reaction to radio and television broadcasts. In such system, audio signals are transmitted from certain representative radio or television receivers to a central or monitoring station where they are compared with audio signals received directly from broadcasting stations. By means of such system, it is possible to determine at any time whether or not each monitored receiver is in operation and, if so, the broadcasting station to which it is tuned.

In utilizing the above-mentioned system, it is possible to compare the audio signals in various ways, but it has been found from actual practice that it is advantageous to compare the signals by means of an electrical comparator which may serve to operate a recorder.

As indicated above, the present invention relates to the signal comparator of such a system, and this application is a continuation-in-part of the above-mentioned application.

The principal object of the present invention is to provide an improved electrical comparator for the above-mentioned purpose.

A further object of the invention is to provide a signal comparator circuit which is highly efficient in operation and which is simple in construction and capable of economic manufacture.

Figure 1:
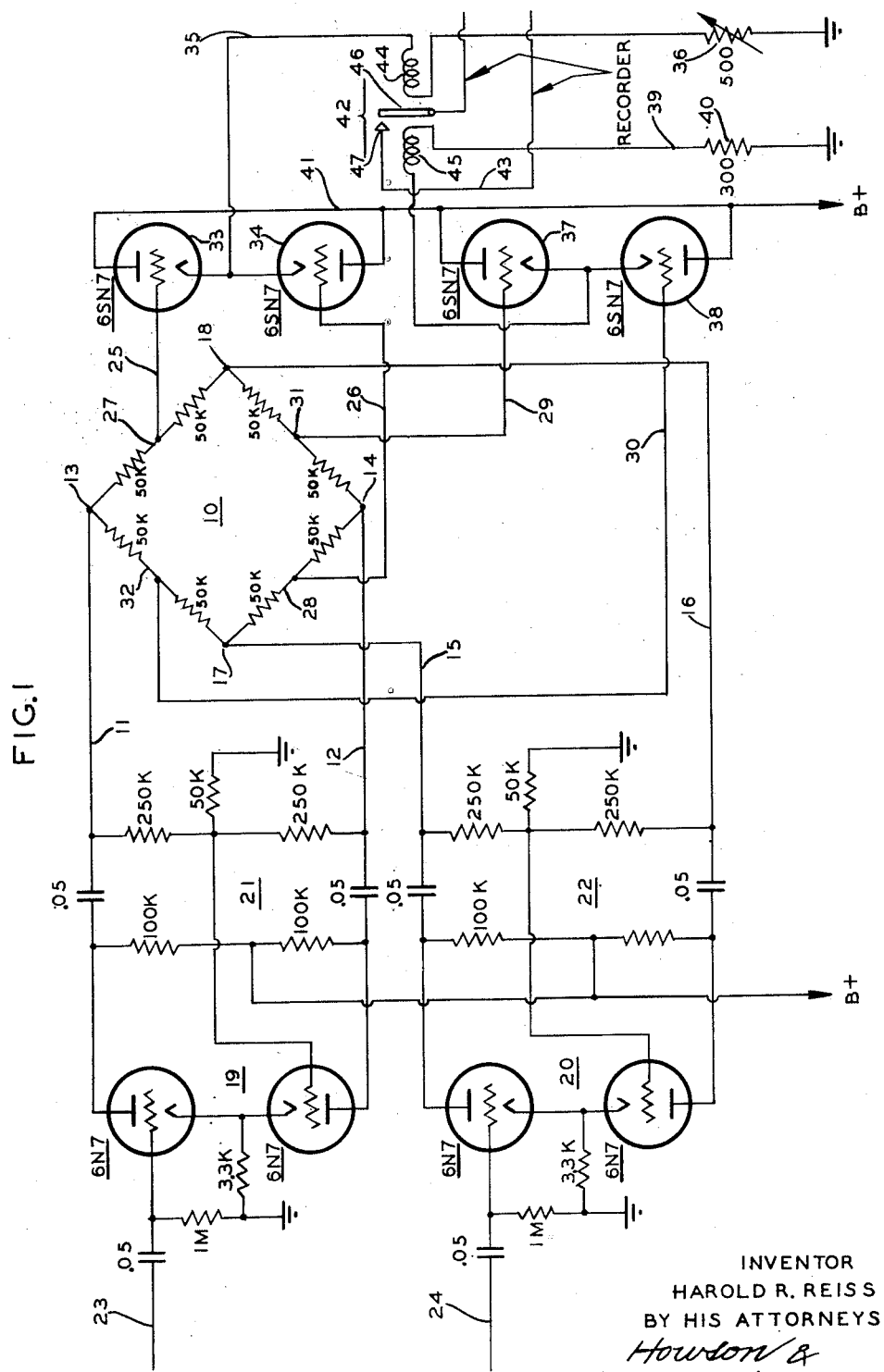
Figure 2:
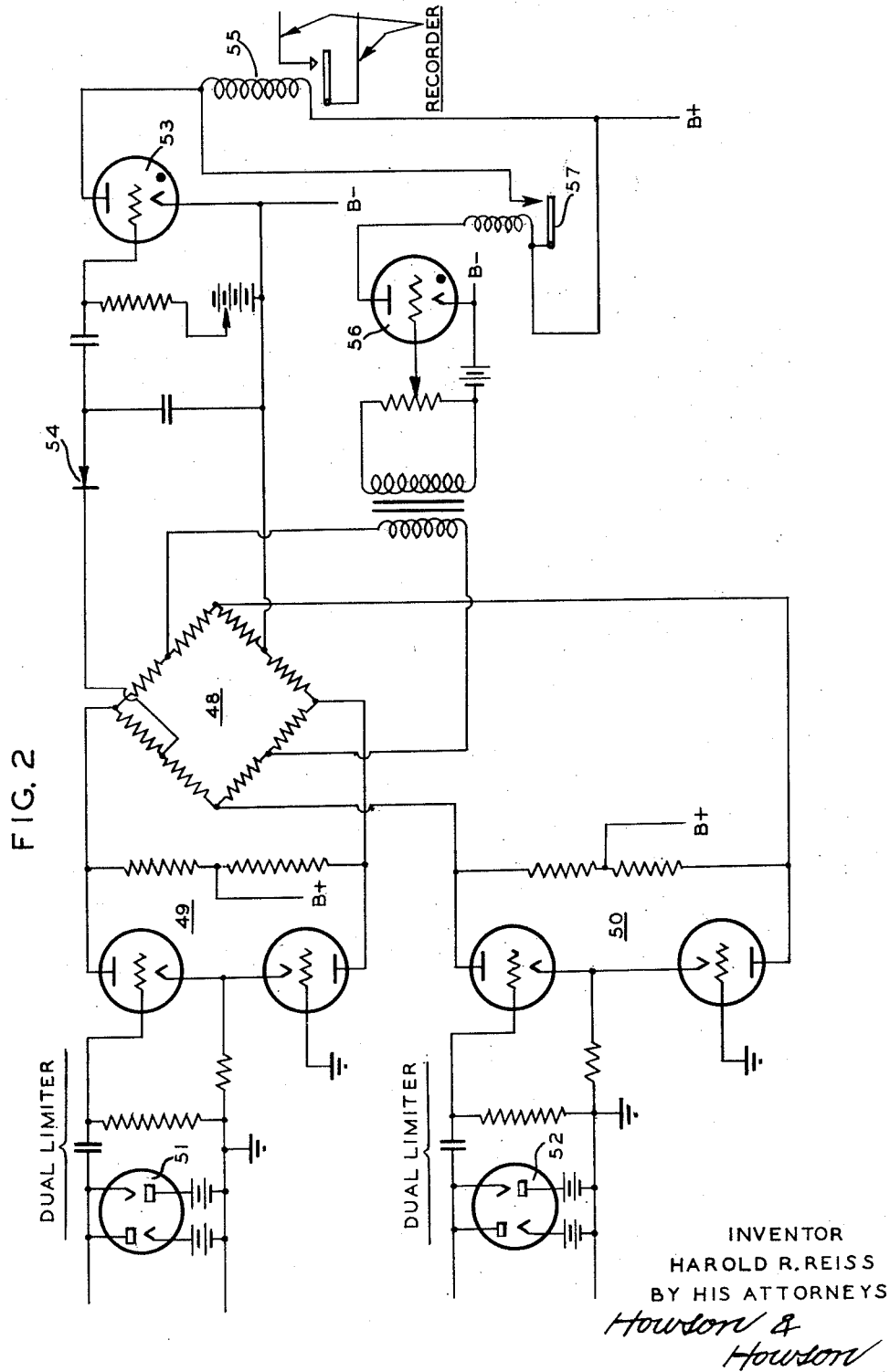

The invention may be fully understood from the following detailed description with reference to the accompanying drawings, wherein:

Fig. 1 is a diagrammatic illustration of a preferred form of the novel circuit provided by the invention; and Fig. 2 is a similar illustration of another embodiment.

Referring first to Fig. 1 of the drawings, in accordance with the present invention, there is provided a four-arm impedance bridge 10 which is utilized in a manner to effect comparison of the frequency and phase of two signals. One signal is applied via input circuit 11, 12 to the diagonally opposed terminals 13 and 14 of said bridge, while the other signal is applied via input circuit 15, 16 to the other pair of diagonally opposed terminals 17 and 18 of the bridge. Preferably, the signals are applied to the bridge through push-pull stages 19 and 20 of conventional form which are coupled to the bridge by means of resistance-capacitance networks 21 and 22. With this circuit arrangement, one signal is supplied to the comparator system via conductor 23, while the other signal is supplied via conductor 24. In practice, the signals may be passed through suitable limiting or clipping devices and may be amplified prior to application to the comparator system.

Connected to the bridge 10 are two output circuits, one output circuit 25, 26 being connected to intermediate points of the opposed bridge arms 27 and 28, and the other output circuit 29, 30 being connected to intermediate points of opposed arms 31 and 32. Preferably, the output circuits are connected to cathode follower tubes in an arrangement now to be described. The output conductors 25 and 26 are connected to the grids of cathode follower tubes 33 and 34 which have a common cathode load circuit 35 including a resistor 36 which is preferably variable. The output conductors 29 and 30 are connected to the grids of cathode follower tubes 37 and 38 which have a common cathode load circuit 39 including a resistor 40. The necessary plate voltage for the four cathode follower tubes is supplied by means of a common supply conductor 41 from a suitable B+ source.

The cathode follower tubes may serve to control a relay 42 which, in turn, may control the circuit 43 of a recorder (not shown). The recorder may be of the printing type adapted to print a mark on a paper or tape whenever energized by virtue of the closure of the circuit 43. The relay 42 comprises two windings 44 and 45 acting in opposition to one another, and a movable contact 46 controlled by said windings and adapted to close the circuit 43 when it engages the stationary contact 47. The winding 44 is included in the common cathode load circuit of tubes 33 and 34, and it is arranged to exert a force on contact 46 tending to maintain the latter in a circuit-open position. The windings 45 is included in the common cathode load circuit of tubes 37 and 38, and it is arranged to exert a force on contact 46 tending to move the latter to a circuit-closed position.

Considering the operation of the system, when the two signals being compared are not identical in frequency and phase, the force exerted by winding 44 is sufficient to hold the relay 42 open. This is accomplished by suitable adjustment of resistor 36, and by virtue of the relative magnitudes of the two output voltages of bridge 10. However, when the two signals being compared are substantially identical in frequency and phase, the output voltage across conductors 29 and 30 is a maximum, while the output voltage across conductors 25 and 26 is a minimum. Consequently, the current flow through the winding 45 is sufficiently great, in comparison to the current flow through winding 44, to close the relay 42, thereby closing the circuit 43. Thus, the circuit 43 is closed only when the two signals being compared are substantially identical in frequency and phase.

The bridge system described is well suited for the comparison of two audio frequency signals to determine whether or not the signals are identical, as in a system of the character hereinbefore mentioned for determining public reaction to radio or television broadcasts. By way of example the elements of the system may be as indicated on the drawings.

In Fig. 2, there is shown an alternative form of the signal comparing system which is also disclosed in the aforementioned copending application. Referring to Fig. 2, the two signals to be compared are applied to a dual bridge 48 through push-pull stages 49 and 50, respectively, dual limiters 51 and 52 preferably being provided in the two signal channels. A thyratron 53 is connected to the bridge as shown through a rectifier 54 so as to be triggered whenever the two signals are identical. The thyratron actuates a recording relay 55 which controls suitable recording means (not shown).

A second thyratron 56 is coupled to the bridge 48 as shown and serves to actuate a lock-out relay 57 which, when energized, short circuits the winding of relay 55. The purpose of this arrangement is to prevent actuation of relay 55 except when the two signals are identical.

With the arrangement shown in Fig. 2, when the two applied signals are identical, the voltage applied to the grid of thyratron 53 is a maximum, while the voltage applied to the grid of thyratron 56 is a minimum. Consequently, the thyratron 53 is fired because the voltage applied to its grid is greater than the threshold voltage established by the biasing battery. However, the thyratron 56 is not fired because the voltage applied to its grid is lower than the threshold voltage established by the biasing battery. Under such conditions, the relay 55 is energized while relay 57 is not energized. Therefore, the recorder is actuated by relay 55.

If the two signals applied to the bridge are not identical, the voltage applied to the grid of thyratron 56 will be sufficient to override the bias and fire that thyratron, energizing relay 57. It is unlikely that the voltage applied to the grid of thyratron 53 would be sufficient to override the bias thereof but if it did the relay 55 would not be energized due to the fact that its winding is short circuited through the operation of relay 57. Thus the thyratron 56 and its associated relay serve to insure that the recorder will not be actuated to give a false indication when the two signals are not identical.

While the invention has been illustrated and described with reference to certain embodiments, it is not limited thereto but is capable of other embodiments and modifications.

I claim:

1. A system for determining and recording substantial coincidence of frequency and phase of two audio signal waves, comprising a four-arm impedance bridge having two pairs of diagonally opposed terminals, a first signal input circuit connected to one pair of diagonally opposed terminals of said bridge, a second signal input circuit connected to the second pair of diagonally opposed terminals of said bridge, a first output circuit connected to intermediate points of two opposed arms of said bridge, a second output circuit connected to intermediate points of the other two opposed arms of said bridge, a circuit to be controlled, and means connected to said output circuits for closing said last-recited circuit only in the event of substantial coincidence of frequency and phase of two audio signals applied to said input circuits.

2. A system for determining and recording substantial coincidence of frequency and phase of two audio signal waves, comprising a four-arm impedance bridge having two pairs of diagonally opposed terminals, a first signal input circuit connected to one pair of diagonally opposed terminals of said bridge, a second signal input circuit connected to the second pair of diagonally opposed terminals of said bridge, a first output circuit connected to intermediate points of two opposed arms of said bridge, a second output circuit connected to intermediate points of the other two opposed arms of said bridge, a circuit to be controlled, and a relay arranged to control said last-recited circuit and having two windings coupled respectively to said output circuits, whereby to effect closure of the last-recited circuit only in response to substantial coincidence of frequency and phase of two audio signals applied to said input circuits.

3. A system for determining and recording substantial coincidence of frequency and phase of two audio signal waves, comprising a four-arm impedance bridge having two pairs of diagonally opposed terminals, a first signal input circuit connected to one pair of diagonally opposed terminals of said bridge, a second signal input circuit connected to the second pair of diagonally opposed terminals of said bridge, a first pair of cathode follower tubes having a common cathode load circuit and having their control grids connected respectively to intermediate points of two opposed arms of said bridge, a second pair of cathode follower tubes having a common cathode load circuit and having their control grids connected respectively to intermediate points of the other two opposed arms of said bridge, a circuit to be controlled, and means controlled by the load currents of said tubes for effecting closure of the last-recited circuit only in response to substantial coincidence of frequency and phase of two audio signals applied to said input circuits.

4. A system for determining and recording substantial coincidence of frequency and phase of two audio signal waves, comprising a four-arm impedance bridge having two pairs of diagonally opposed terminals, a first signal input circuit connected to one pair of diagonally opposed terminals of said bridge, a second signal input circuit connected to the second pair of diagonally opposed terminals of said bridge, a first pair of cathode follower tubes having a common cathode load circuit and having their control grids connected respectively to intermediate points of two opposed arms of said bridge, a second pair of cathode follower tubes having a common cathode load circuit and having their control grids connected respectively to intermediate points of the other two opposed arms of said bridge, a circuit to be controlled, and a relay arranged to control said last-recited circuit and having two windings included respectively in said cathode load circuits, whereby to effect closure of the last-recited circuit only in response to substantial coincidence of frequency and phase of two audio signals applied to said input circuits.

5. A system for determining and recording substantial coincidence of frequency and phase of two audio signal waves, comprising a four-arm impedance bridge having two pairs of diagonally opposed terminals, a first signal input circuit connected to one pair of diagonally opposed terminals of said bridge, a first push-pull stage arranged to supply an audio signal to said input circuit, a second signal input circuit connected to the second pair of diagonally opposed terminals of said bridge, a second push-pull stage arranged to supply a second audio signal to said second input circuit, a first output circuit connected to intermediate points of two opposed arms of said bridge, a second output circuit connected to intermediate points of the other two opposed arms of said bridge, a circuit to be controlled, and means connected to said output circuits for closing said last-recited circuit only in the event of substantial coincidence of frequency and phase of two audio signals applied to said input circuits.

6. A system for determining and recording substantial coincidence of frequency and phase of two audio signal waves, comprising a four-arm impedance bridge having two pairs of diagonally opposed terminals, a first signal input circuit connected to one pair of diagonally opposed terminals of said bridge, a first push-pull stage arranged to supply an audio signal to said input circuit, a second signal input circuit connected to the second pair of diagonally opposed terminals of said bridge, a second push-pull stage arranged to supply a second audio signal to said second input circuit, a first output circuit connected to intermediate points of two opposed arms of said bridge, a second output circuit connected to intermediate points of the other two opposed arms of said bridge, a circuit to be controlled, and means connected to said output circuits for effecting closure of the last-recited circuit only in response to substantial coincidence of frequency and phase of two audio signals applied to said input circuits.

7. A system for determining and recording substantial coincidence of frequency and phase of two audio signal waves, comprising a four-arm impedance bridge having two pairs of diagonally opposed terminals, a first signal input circuit connected to one pair of diagonally opposed terminals of said bridge, a first push-pull stage arranged to supply an audio signal to said input circuit, a second signal input circuit connected to the second pair of diagonally opposed terminals of said bridge, a second push-pull stage arranged to supply a second audio signal to said second input circuit, a first output circuit connected to intermediate points of two opposed arms of said bridge, a second output circuit connected to intermediate points of the other two opposed arms of said bridge, a circuit to be controlled, and a relay arranged to control said last-recited circuit and having two windings coupled respectively to said output circuits, whereby to effect closure of the last-recited circuit only in response to substantial coincidence of frequency and phase of two audio signals applied to said input circuits.

8. A system for determining and recording substantial coincidence of frequency and phase of two audio signal waves, comprising a four-arm impedance bridge having two pairs of diagonally opposed terminals, a first signal input circuit connected to one pair of diagonally opposed terminals of said bridge, a first push-pull stage arranged to supply an audio signal to said input circuit, a second signal input circuit connected to the second pair of diagonally opposed terminals of said bridge, a second push-pull stage arranged to supply a second audio signal to said second input circuit, a first pair of cathode follower tubes having a common cathode load circuit and having their control grids connected respectively to intermediate points of two opposed arms of said bridge, a second pair of cathode follower tubes having a common cathode load circuit and having their control grids connected respectively to intermediate points of the other two opposed arms of said bridge, a circuit to be controlled, and means controlled by the load currents of said tubes for effecting closure of the last-recited circuit only in response to substantial coincidence of frequency and phase of two audio signals applied to said input circuits.

9. A system for determining and recording substantial coincidence of frequency and phase of two audio signal waves, comprising a four-arm impedance bridge having two pairs of diagonally opposed terminals, a first signal input circuit connected to one pair of diagonally opposed terminals of said bridge, a first push-pull stage arranged to supply an audio signal to said input circuit, a second signal input circuit connected to the second pair of diagonally opposed terminals of said bridge, a second push-pull stage arranged to supply a second audio signal to said second input circuit, a first pair of cathode follower tubes having a common cathode load circuit and having their control grids connected respectively to intermediate points of two opposed arms of said bridge, a second pair of cathode follower tubes having a common cathode load circuit and having their control grids connected respectively to intermediate points of the other two opposed arms of said bridge, a circuit to be controlled, and a relay arranged to control said last-recited circuit and having two windings included respectively in said cathode load circuits, whereby to effect closure of the last-recited circuit only in response to substantial coincidence of frequency and phase of two audio signals applied to said input circuits.

HAROLD R. REISS.

REFERENCES CITED

The following references are of record in the file of this patent:

UNITED STATES PATENTS

| Number | Name | Date |
| --- | --- | --- |
| 2,031,509 | Seeley | Feb. 18, 1936 |
| 2,146,526 | Bushbeck | Feb. 7, 1939 |
| 2,169,116 | Thompson | Aug. 8, 1939 |
| 2,283,566 | Miller | May 19, 1942 |
| 2,288,280 | Hornbruch | June 30, 1942 |
| 2,365,218 | Rogers | Dec. 19, 1944 |
| 2,456,199 | Lamb | Dec. 14, 1948 |

OTHER REFERENCES

Crosby, Abs. Appl. No. 605,128, August 23, 1949.